Patented Aug. 14, 1934

1,970,353

UNITED STATES PATENT OFFICE 1,970,353

TEXTILE ASSISTANTS AND PROCESS OF MAKING SAME

Otto Albrecht, Basel, Switzerland, assignor to the firm of Society of Chemical Industry in Basle, Basel, Switzerland No Drawing. Application November 22, 1933, Serial No. 699,302. In Switzerland November 26, 1932

15 Claims. (Cl. 260—99.12)

This invention relates to the manufacture of valuable textile assistants by condensing a terpene alcohol or an unsaturated aliphatic alcohol, containing at least 6 carbon atoms, with an aromatic compound in presence of a condensing agent, such as aluminium chloride, and then sulfonating the product or conducting the condensation and sulfonation simultaneously, the condensation taking place in such a manner that there is an addition of the aromatic hydrocarbon or its derivative at a double bond of the unsaturated alcohol.

As parent materials may be mentioned, for example, higher unsaturated aliphatic primary, secondary or tertiary alcohols with normal or ramified carbon chain, for instance oleic alcohol, undecylenic alcohol, erucyl alcohol or unsaturated alcohols, such as are obtainable by reducing unsaturated fatty acid esters. There also come into consideration the alcohols occurring in certain waxes, for example in sperm oil or in Dögling's oil, insofar as they are unsaturated to a certain extent. It is also possible to start from unsaturated alcohols which are produced by treating chlorinated paraffins with alkalies, whereby double bonds are produced in consequence of the elimination of hydrogen chloride. Such alcohols are, as is well-known, primary, secondary or tertiary alcohols. They possess straight or ramified carbon chains. Valuable products can also be obtained from terpene alcohols, such as terpineol, fenchyl alcohol, borneol, isopulegol and the like.

A suitable parent material is also furnished by pine oil which contains substantial proportions of terpene alcohols. For condensation with the said alcohols there may be used aromatic compounds, inter alia hydrocarbons, such as benzene, toluene, xylene, cumene, cymene, diphenyl, naphthalene or alkylated naphthalenes, further derivatives of these hydrocarbons, such as phenol, chlorophenols, cresols, naphthols, chlorocresols, ethers, such as anisol, diphenyloxide, diphenylene oxide, and the like. Such products correspond to the general formula $R(x)_n$, wherein R stands for an aromatic nucleus, $x$ for hydrogen or a substituent selected from a group consisting of OH, alkyl and alkoxy, and $n$ for a whole number not greater than 2.

The alcohol and the hydrocarbon may be heated together with the condensing agent, such as aluminium chloride, zinc chloride or the like; or may be mixed with sulfuric acid and allowed to stand, if desired after addition of a diluent, such as glacial acetic acid. For subsequent sulfonation there may be used concentrated sulfuric acid, sulfuric acid monohydrate, chlorosulfonic acid, fuming sulfuric acid or mixtures of any of these. If desired, the condensation and the sulfonation may be simultaneously effected with the aid of acid condensing agents, such as concentrated sulfuric acid, chlorosulfonic acid or fuming sulfuric acid. It is also advisable to add to the sulfonating agent a solvent or diluent, for instance ether, glacial acetic acid or a substance having an affinity for water, such as an anhydride or chloride of an organic acid, for instance, acetic anhydride or acetic chloride. According to the conditions a sulfuric acid ester or a true sulfonic acid or a mixture of the two is produced.

The products made in this manner are the sulfonation products of aromatic compounds of the general formula $R(x)_n y$, wherein R stands for an aromatic nucleus, $x$ for hydrogen or a substituent selected from a group consisting of OH, alkyl and alkoxy, $n$ for a whole number not greater than 2, and $y$ for a hydroxyalkyl radical containing at least 6 carbon atoms. Owing to their power of promoting wetting and their cleansing and emulsifying action they are applicable for the many purposes of the textile, leather and allied industries. They may be used alone or together with solvents, soaps or substances resembling soaps.

The following examples illustrate the invention, the parts being by weight:—

Example 1

134 parts of oleic alcohol are dissolved in 480 parts of benzene, 67 parts of dry aluminium chloride are added and the whole is heated to boiling until the reaction is complete. The desired product is extracted from the mass by means of ether or another suitable solvent, such as benzine, toluene, chlorobenzene, tetrachlorethane, etc., and the extract is shaken with hydrochloric acid of 20 per cent. strength; the ethereal solution is then washed with water until free from acid, the ether is distilled and the residue is fractionated in a vacuum. The portion boiling at 193–205° C. at a pressure of 1 mm. mercury has the iodine number 1.4, whereas the iodine number of the parent oleic alcohol is 72.4. The double bond of the oleic alcohol used is therefore almost completely saturated by condensation.

For the sulfonation 10 parts of the condensation product obtained as described above are dissolved in 20 parts of dry diethylether or trichlorethylene and into the solution are dropped, while cooling, 10 parts of chlorosulfonic acid of about −10 to about −5° C. The whole is stirred for some time at this temperature, the solvent is allowed to evaporate and the residue is neutralized. There is thus obtained a colorless paste containing, if the neutralization is effected with sodium hydroxide, the sodium salt of the sulfonation product of the body of the probable formula

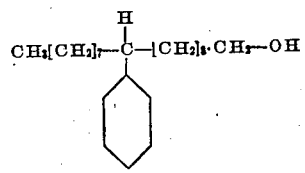

which paste is clearly soluble in water and has pronounced cleansing properties.

The operation is conducted similarly with the other aromatic compounds mentioned in the introduction.

For scouring raw wool there may be used a solution containing per liter so much of the aforesaid paste as corresponds with 1 gram of pure sulfonate. The wool which has been washed for ½ hour at a temperature of 45° C. is pure white and voluminous.

*Example 2*

42.8 parts of ortho-chlorophenol are mixed with 51.3 parts of pine oil. Into the mixture are allowed to drop gradually, while stirring and cooling, 94.1 parts of chlorosulfonic acid, the temperature being maintained below about 10° C. Stirring for some time at room temperature follows, during which a lively evolution of hydrochloric acid occurs, and the whole is then poured upon ice. The sulfonation product thus precipitated is washed with sodium chloride solution, neutralized and adjusted by addition of water to the desired concentration. There is obtained an oil clearly soluble in water which has good wetting power, for example in dilute sulfuric acid, and can therefore be used with advantage in carbonizing.

*Example 3*

87.3 parts of chlorosulfonic acid are allowed to flow gradually, while stirring and cooling, into a mixture of 36 parts of meta-cresol and 51.3 parts of pine oil, the temperature being maintained below about 10° C. The temperature may then be allowed to rise to about 20° C. and there are added at about 20–25° C. a further 77.2 parts of chlorosulfonic acid. A lively reaction sets in, the mass is poured on ice and the sulfonation product which has been precipitated is washed with sodium chloride solution. After separating the washing water, the viscid reaction product which has been obtained is neutralized and adjusted by addition of water to the desired strength. There is obtained an oil clearly soluble in water which, for example in water, wets well and is therefore suitable for the preliminary wetting of material which is wetted with difficulty.

*Example 4*

100 parts of phenol are dissolved, while stirring, in 165 parts of terpineol and 200 parts of sulfuric acid monohydrate are allowed to drop into the solution. Soon after the beginning of this addition the temperature of the mixture rises to 50–60° C. and the further addition is controlled so that the temperature is maintained without external supply of heat.

When all the sulfuric acid has been added the mixture is stirred for another 20 hours at 60° C., whereby a thick liquid mass is formed.

This is now poured into water, which has been made alkaline with caustic soda solution, and through this mixture steam is passed until no further volatile portions are expelled. The condensation product is a yellow resinous mass, collected on the walls of the vessel, and in the cold is brittle and capable of being powdered.

1 part of this condensation product is dissolved in 1 part of ether, and, while cooling with ice, 1 part of chlorosulfonic acid is allowed to drop into the solution by degrees. There is thus obtained a sulfonation mass completely soluble in water, which when poured into water, neutralized with caustic soda solution and evaporated to dryness, yields 2.2 parts of a salt which is only feebly yellowish and has good washing properties.

What I claim is:—

1. Process for the manufacture of textile assistants, consisting in condensing an aliphatic unsaturated alcohol containing at least 6 carbon atoms with an aromatic compound in presence of a condensing agent, and sulfonating the product.

2. Process for the manufacture of textile assistants, consisting in condensing an aliphatic unsaturated alcohol containing at least 6 carbon atoms with an aromatic compound of the general formula $R(x)_n$, wherein R stands for an aromatic nucleus, $x$ for hydrogen or a substituent selected from a group consisting of OH, alkyl and alkoxy, and $n$ for a whole number not greater than 2, in presence of a condensing agent, and sulfonating the product.

3. Process for the manufacture of textile assistants, consisting in condensing an unsaturated primary normal alcohol containing at least 6 carbon atoms with an aromatic compound of the general formula $R(x)_n$, wherein R stands for an aromatic nucleus, $x$ for hydrogen or a substituent selected from a group consisting of OH, alkyl and alkoxy, and $n$ for a whole number not greater than 2, in presence of a condensing agent, and sulfonating the product.

4. Process for the manufacture of textile assistants, consisting in condensing oleic alcohol with an aromatic compound of the general formula $R(x)_n$, wherein R stands for an aromatic nucleus, $x$ for hydrogen or a substituent selected from a group consisting of OH, alkyl and alkoxy, and $n$ for a whole number not greater than 2, in presence of a condensing agent, and sulfonating the product.

5. Process for the manufacture of textile assistants, consisting in condensing oleic alcohol with an aromatic hydrocarbon in presence of a condensing agent, and sulfonating the product.

6. Process for the manufacture of textile assistants, consisting in condensing oleic alcohol with an aromatic hydrocarbon of the benzene series in presence of a condensing agent, and sulfonating the product.

7. Process for the manufacture of textile assistants, consisting in condensing oleic alcohol with an aromatic hydroxy compound in presence of a condensing agent, and sulfonating the product.

8. Process for the manufacture of textile assistants, consisting in condensing oleic alcohol with an aromatic hydroxy compound of the benzene series in presence of a condensing agent, and sulfonating the product.

9. The sulfonation products of aromatic compounds of the general formula $R(x)_n y$, wherein R stands for an aromatic nucleus, $x$ for hydrogen or a substituent selected from a group consisting of OH, alkyl and alkoxy, $n$ for a whole number not greater than 2, and $y$ for a hydoxyalkyl radical containing at least 6 carbon atoms, which products yield with alkalies salts which, when dissolved in water, have excellent wetting, cleansing and emulsifying properties.

10. The sulfonation products of aromatic compounds of the general formula $R(x)_n y$, wherein R stands for an aromatic nucleus, $x$ for hydrogen or a substituent selected from a group consisting of OH and alkyl, $n$ for a whole number not greater than 2, and $y$ for a hydroxyalkyl radical containing at least 6 carbon atoms, which products yield with alkalies salts which, when dissolved in water, have excellent wetting, cleansing and emulsifying properties.

11. The sulfonation products of aromatic compounds of the general formula $R(x)_n y$, wherein R stands for an aromatic nucleus of the benzene series, $x$ for hydrogen or a substituent selected from a group consisting of OH and alkyl, $n$ for a whole number not greater than 2, and $y$ for a hydroxyalkyl radical containing at least 6 carbon atoms, which products yield with alkalies salts which, when dissolved in water, have excellent wetting, cleansing and emulsifying properties.

12. The sulfonation products of aromatic compounds of the general formula $Ry$, wherein R stands for an aromatic radical of the benzene series, and $y$ for a hydroxyalkyl radical containing at least 6 carbon atoms, which products yield with alkalies salts which, when dissolved in water, have excellent wetting, cleansing and emulsifying properties.

13. The sulfonation products of aromatic compounds of the general formula $Ry$, wherein R stands for a hydroxylated aromatic radical of the benzene series, and $y$ for a hydroxyalkyl radical containing at least 6 carbon atoms, which products yield with alkalies salts which, when dissolved in water, have excellent wetting, cleansing and emulsifying properties.

14. The sulfonation products of aromatic compounds of the general formula $Ry$, wherein R stands for an aromatic radical of the benzene series, and $y$ for the radical

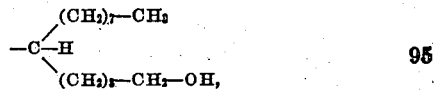

which products yield with alkalies salts which, when dissolved in water, have excellent wetting, cleansing and emulsifying properties.

15. The sulfonation products of aromatic compounds of the general formula $Ry$, wherein R stands for a hydroxylated aromatic radical of the benzene series, and $y$ for the radical

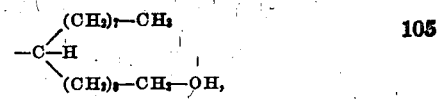

which products yield with alkalies salts which, when dissolved in water, have excellent wetting, cleansing and emulsifying properties.

OTTO ALBRECHT.